United States Patent
Gustavsson et al.

(10) Patent No.: US 11,463,970 B2
(45) Date of Patent: Oct. 4, 2022

(54) WIRELESS REFERENCE SIGNAL DISTRIBUTION

(71) Applicant: Telefonaktiebolaget LM Ericsson (publ), Stockholm (SE)

(72) Inventors: Ulf Gustavsson, Gothenburg (SE); Ted Johansson, Djursholm (SE); Erik Larsson, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/483,625

(22) PCT Filed: Mar. 8, 2017

(86) PCT No.: PCT/EP2017/055382
§ 371 (c)(1),
(2) Date: Aug. 5, 2019

(87) PCT Pub. No.: WO2018/162051
PCT Pub. Date: Sep. 13, 2018

(65) Prior Publication Data
US 2020/0128500 A1    Apr. 23, 2020

(51) Int. Cl.
*H04W 56/00*    (2009.01)
*H04B 7/0452*    (2017.01)
(52) U.S. Cl.
CPC ...... *H04W 56/0015* (2013.01); *H04B 7/0452* (2013.01)
(58) Field of Classification Search
CPC .................................................. H04W 56/0015
See application file for complete search history.

(56) References Cited

U.S. PATENT DOCUMENTS 4,514,719 A * 4/1985 Suzuki ............. H04B 3/542
340/12.33
6,320,434 B1 * 11/2001 Chang ............. H03K 5/135
327/141

(Continued)

OTHER PUBLICATIONS

Yang, Y. et al., "Phase Synchronization for Coherent MIMO Radar: Algorithms and Their Analysis", IEEE Transactions on Signal Processing, vol. 59 No. 11, Nov. 1, 2011, pp. 5538-5557, IEEE.

(Continued)

*Primary Examiner* — Edan Orgad
*Assistant Examiner* — Won Tae C Kim
(74) *Attorney, Agent, or Firm* — Coats & Bennett, PLLC (57) ABSTRACT

The present disclosure relates to a system (100) for wireless reference signal distribution. The system (100) comprises an antenna array (135) comprising a plurality of transceivers (140a, 140b). The antenna array (135) is arranged to transmit and receive a in radio signal via the plurality of transceivers (140a, 140b). The system (100) further comprises a synchronization signal generator (110) arranged to transmit wirelessly at least one synchronization signal. Each synchronization signal comprises at least one time-dependent signal component, wherein the at least one synchronization signal has at least one time-dependent signal component with an amplitude above a predetermined threshold during a total duration of the at least one synchronization signal. Each transceiver (140a, 140b) is connected to a respective synchronization signal receiver (130a, 130b) arranged to receive the at least one synchronization signal. The synchronization signal receiver (130a, 130b) is arranged to generate a reference signal for the respective transceiver (140a, 140b) based on the received at least one synchronization signal. The present disclosure also relates to corresponding methods and computer programs.

20 Claims, 5 Drawing Sheets

(56) References Cited

U.S. PATENT DOCUMENTS

| | | | |
|---|---|---|---|
| 2006/0045198 A1 | 3/2006 | Magee et al. | |
| 2006/0109927 A1 | 5/2006 | Magee et al. | |
| 2010/0135257 A1* | 6/2010 | Higuchi | H04L 27/2602 370/336 |
| 2011/0121761 A1* | 5/2011 | Zhao | H05B 45/14 315/312 |
| 2014/0225676 A1* | 8/2014 | Hsieh | G01R 31/2824 331/25 |
| 2016/0374022 A1* | 12/2016 | Ang | H04W 52/0235 |
| 2018/0115371 A1* | 4/2018 | Trotta | H04B 1/38 |

OTHER PUBLICATIONS

Roy, A. et al., "RF/Wireless Interconnects in Future On-Chip and Board-Level Clock Distribution Network", IEEE EIT 2007 Proceedings, May 17, 2007, pp. 542-545, IEEE.

Floyd, B. et al., "Intra-Chip Wireless Interconnect for Clock Distribution Implemented With Integrated Antennas, Receivers, and Transmitters", IEEE Journal of Solid-State Circuits, vol. 37 No. 5, May 1, 2002, pp. 543-552, IEEE.

Zhang, Y. et al., "Antenna-on-Chip and Antenna-in-Package Solutions to Highly Integrated Millimeter-Wave Devices for Wireless Communications", IEEE Transactions on Antennas and Propagation, vol. 57 No. 10, Oct. 1, 2009, pp. 2830-2841, IEEE.

Puglielli, A. et al., "Design of Energy- and Cost-Efficient Massive MIMO Arrays", Proceedings of the IEEE, vol. 104 No. 3, Mar. 1, 2016, pp. 586-606, IEEE.

Mudumbai, R. et al., "Distributed Transmit Beamforming: Challenges and Recent Progress", IEEE Communications Magazine, Feb. 1, 2009, pp. 102-110, IEEE.

Vieira, J. et al., "A Flexible 100-Antenna Testbed for Massive MIMO", 2014 IEEE Globecom Workshops, Dec. 8, 2014, pp. 287-293, IEEE.

Larsson, E. et al., "Massive MIMO for Next Generation Wireless Systems", IEEE Communications Magazine, Feb. 1, 2014, pp. 186-195, IEEE.

Laha, S. et al., "A New Frontier in Ultralow Power Wireless Links: Network-on-Chip and Chip-to-Chip Interconnects", IEEE Transactions on Computer-Aided Design of Integrated Circuits and Systems, vol. 34 No. 2, Feb. 1, 2015, pp. 186-198, IEEE.

* cited by examiner

WIRELESS REFERENCE SIGNAL DISTRIBUTION

TECHNICAL FIELD

The present disclosure relates to the field of wireless communication. In particular, it relates to systems, methods and computer programs for reference signal distribution for antenna arrays comprising a plurality of radio frequency transceivers.

BACKGROUND

Massive MIMO is an emerging technique for wireless access, where hundreds of phase-coherently operating base station antennas of an antenna array serve many users on the same time-frequency resource.

In a conventional base station for mobile communications, e.g. 4G LTE, 50-150 W of average power is transmitted using a single antenna, with high requirements on the radio parameters of the power amplifier, PA, in the base station. In a Massive Multiple Input Multiple Output, MIMO, system, each antenna is served by a small radio transceiver, each transceiver transmitting e.g. 10-100 mW, with much lower requirements on linearity and other radio parameters, still reaching similar or better performance as compared to the conventional solution.

In a Massive MIMO system, the antennas are placed at least $\lambda/2$ distance from each other, wherein $\lambda$ is the wavelength of the transceiver operating frequency. For example, for a frequency of 6 GHz, i.e. low 5G band, and 10×10 antennas, the smallest dimensions of such an antenna array will be 25×25 cm and will require 100 radio transceivers for this array. How to build and partition Massive MIMO radio transceivers and antenna arrays in a technical and economical feasible way will be a challenge.

In a Massive MIMO array, a large number of integrated circuits, ICs, are typically mounted on the back, i.e. ground plane, of an antenna array. Each IC is directly connected to a patch antenna, and each IC contains the radio frequency, RF, and baseband processing circuitry required by that antenna. Electrical connections are furthermore provided at each IC for the transmission of baseband data.

One of the most important requirements for a Massive MIMO system is that all signals from the antenna array are phase-coherently generated to be able to create coherent superposition of wave fronts. The phase noise should also be low. In current experimental Massive MIMO testbeds, the clocks for synchronization of the different radios are distributed using coaxial cables from stable clock sources to the different radios and then calibrated. This is however not a viable commercial solution due to size and cost restrictions.

For future systems using higher frequencies than today, which would result in physically smaller antenna matrix realizations, the total size of the antenna array would still be large compared to e.g., a single chip. Also, real future systems may use an antenna spacing that is larger than the canonical $\lambda/2$ spacing used in most theoretical studies and current testbeds, since benefits of larger antenna spacing would include decorrelation of the fading, and reduction of mutual coupling.

However, to synchronize hundreds of radio carriers for this Massive MIMO system is a major challenge.

SUMMARY

One object of the present disclosure is to provide a method which seeks to mitigate, alleviate, or eliminate one or more of the above-identified deficiencies in the art and disadvantages singly or in any combination and to provide a system for wireless reference signal distribution.

This object is obtained by a system for wireless reference signal distribution. The system comprises an antenna array comprising a plurality of transceivers. The antenna array is arranged to transmit and receive a radio signal via the plurality of transceivers. The system further comprises a synchronization signal generator arranged to transmit wirelessly at least one synchronization signal, each synchronization signal comprising at least one time-dependent signal component. The at least one synchronization signal has at least one time-dependent signal component with an amplitude above a predetermined threshold during a total duration of the at least one synchronization signal. Each transceiver is connected to a respective synchronization signal receiver arranged to receive the at least one synchronization signal and to generate a reference signal for the respective transceiver based on the received at least one synchronization signal. The disclosed system enables providing well-defined phase references for antenna arrays in an inexpensive and power-efficient manner. No cables, connectors or splitters are needed for the distribution of the synchronization signals. The disclosed system is largely independent of physical dimensions and hence scales very favourably with the antenna array aperture. The wireless transmission reduces degradation and delays of the synchronization signals compared to legacy systems and methods of providing reference signals. The disclosed system further enables the use of transceivers already available as a mature technology, such as millimetre-wave transceivers. By always having a detectable component during the total duration of the at least one synchronization signal, it is ensured that the synchronization signal receiver will always be able to detect the at least one synchronization signal, thereby ensuring that the reference signal distribution is reliable and robust.

According to some aspects, the reference signal is based on down-converting the received at least one synchronization signal. By transmitting the at least one synchronization signal at a frequency higher than the frequency at which a desired carrier is to be generated at the transceivers, and then down-converting the at least one synchronization signal to the desired frequency, a better phase resolution is obtained. The improvement in phase resolution is proportional to the factor at which the down-converting is made.

According to some aspects, each synchronization signal receiver is further arranged to detect the at least one synchronization signal based on the at least one amplitude of the at least one time-dependent signal components.

According to some aspects, each synchronization signal receiver is further arranged to detect the at least one synchronization signal based on envelope characteristics of the at least one synchronization signal.

Since the at least one synchronization signal always has at least one time-dependent signal component above the predetermined threshold during the total duration of the at least one synchronization signal, the amplitude above the predetermined threshold at the moment of detecting the at least one synchronization signal may be used as a basis for detecting the at least one synchronization signal. The predetermined threshold enables arranging the system such that the signal to noise ratio of the received at least one signal is sufficiently high for detection of at least one of the time-dependent signal components. If a plurality of synchronization signals is received, in the form of a superposition, envelope characteristics may constitute a preferable option to detecting the synchronization signals. The envelope characteristics may be determined e.g., by determining a discrete-time analytic signal based on a Hilbert transform of the amplitudes of the plurality of synchronization signals.

According to some aspects, the synchronization signal receiver is further arranged to determine a phase of the at least one synchronization signal based on at least one of the time-dependent signal components.

According to some aspects, the signal receiver is further arranged to determine the phase of the at least one synchronization signal based on a zero-crossing of the time-dependent signal components or a zero-crossing of an envelope of the at least one synchronization signal.

Knowing the time-dependence of the time-dependent signal components and comparing the at least one detected time-dependent signal component of the at least one synchronization signal, the phase of the at least one synchronization signal may be estimated. A zero-crossing of either a signal component or an envelope provides an accurate determination of the phase of the at least one synchronization signal. The determined phase may then be used when generating the reference signal for the transceivers in order to generate a reference signal having a proper phase for coordinating the transceivers of the antenna array.

According to some aspects, each synchronization signal receiver is further arranged to generate the reference signal having a phase based on the determined phase of at least one synchronization signal and a frequency based on down-converting the at least one time-dependent signal component of the at least one synchronization signal. This provides a reference signal having a well-defined phase, suitable for generating phase-coherent wave fronts from the transceivers. The generation of reference signals benefits synergistically from being based on the down-converted synchronization signals, thereby having a phase which is based on well-resolved phase references, as well as being able to use legacy hardware for the generation of a reference signal having a well-defined frequency.

According to some aspects, each synchronization signal receiver comprising a frequency synthesiser arranged to generate the reference signal based on down-converting each received synchronization signal.

According to some aspects, each frequency synthesiser comprises a voltage controlled oscillator arranged to generate the carrier based on down-converting each received synchronization signal.

A frequency synthesiser, such as a voltage controlled oscillator, enables the use of transceivers that are simple in design and thereby provides cost-effective implementations of the system. In particular, the use of existing millimetre-wave transceivers is enabled.

According to some aspects, at least one of the at least one synchronization signal comprises a plurality of time-dependent signal components.

According to some aspects, the synchronization signal generator is arranged to transmit wirelessly a plurality of synchronization signals, wherein each pair of synchronization signals has a relative phase shift.

According to some aspects, at least one of the relative phase shifts is time dependent.

The main principle of detection of the at least one synchronization signal is to detect at least one of the time-dependent signal components which has an amplitude above the predetermined threshold. The ways to arrange the at least one synchronization signal to always have such a signal component are to either introduce a plurality of time-dependent signal components, wherein at least one is always detectable, or to have a plurality of synchronization signals whose superposition enables detection of at least one time-dependent feature based on the time-dependent signal components. It is also possible to arrange a combination of a plurality of synchronization signals, wherein each synchronization signal has a plurality of time-dependent signal components. In other words, three principal combinations are suggested: (i) one synchronization signal having a plurality of time-dependent signal components; (ii) a plurality of synchronization signals, each having one time-dependent signal component; and (iii) a plurality of synchronization signals, each having a plurality of time-dependent signal components. Having relative time-dependent phase shifts of combinations (i) and (ii) enable additional diversity, depending on the form of the time-dependence.

According to some aspects, The system further comprises an electromagnetically sealed box, wherein the synchronization signal generator is arranged inside the electromagnetically sealed box, wherein each synchronization signal receiver is arranged to receive the at least one synchronization signal, and wherein each transceiver is arranged to transmit a generated carrier outside of the electromagnetically sealed box based on the reference signal from the respective synchronization signal receiver.

According to some aspects, each synchronization signal receiver is arranged to detect at least one of the time-dependent signal components of the at least one synchronization signal based on estimating time-invariant characteristics of standing waves of the at least one synchronization signal inside the electromagnetically sealed box.

The electromagnetically shielded box prevents outside interference from affecting the at least one synchronization signal. The electromagnetically shielded box also confines the at least one synchronization signal within the electromagnetically shielded box. Confinement of the at least one synchronization signal within the electromagnetically shielded box affects the fading pattern of the at least one synchronization signal, which may be used in detection of the at least one synchronization signal at the synchronization signal receivers. In particular, the electromagnetically shielded box may result in standing waves of the at least one synchronization signal, whose time-independent properties may be used in determining the phase of the at least one synchronization signal.

According to some aspects, at least one of the at least one synchronisation signal is further modulated to include data. The inclusion of data enables the at least one synchronization signal to provide downstream functions with information and/or be used to transmit data via the transceivers of the antenna array.

The present disclosure also relates to corresponding methods and computer programs for wireless reference signal distribution having the same technical effects and advantages as the disclosed system wireless reference signal distribution.

DETAILED DESCRIPTION

Figure 1:
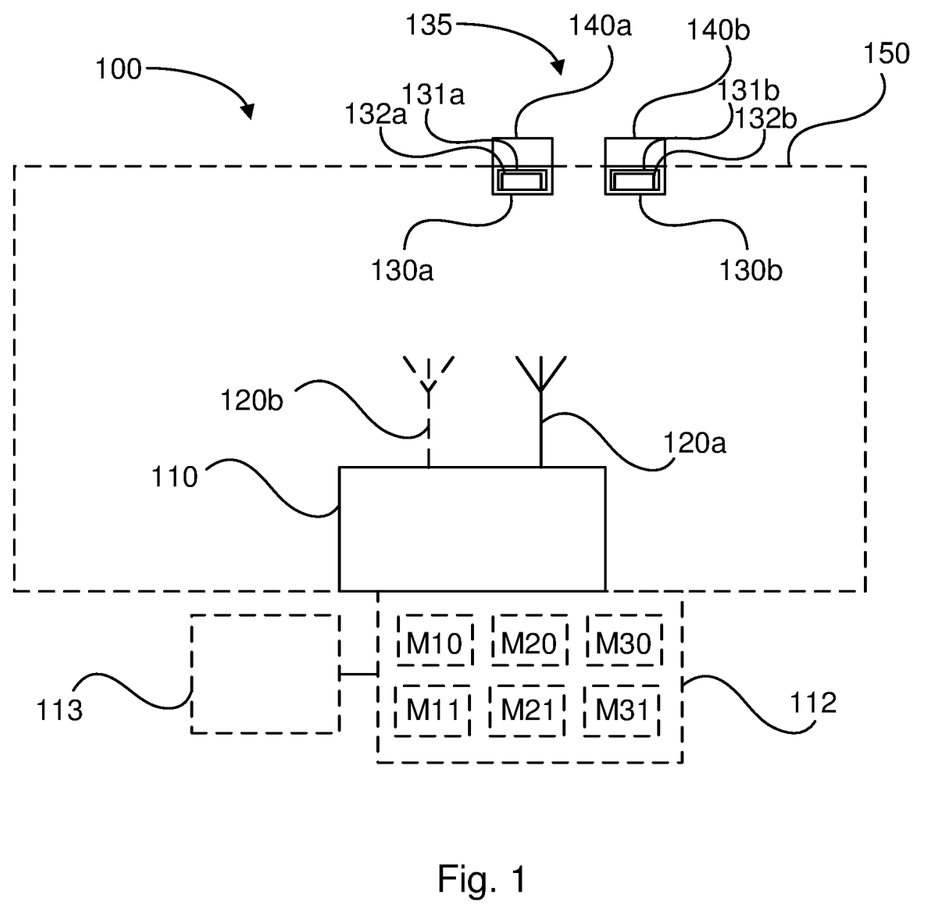
FIG. 1 is block diagram illustrating embodiments of a system for wireless reference signal distribution according to the present disclosure.

FIG. 1 is a block diagram illustrating embodiments of a system 100 for wireless reference signal distribution according to the present disclosure. The system 100 comprises an antenna array 135 comprising a plurality of transceivers 140a, 140b. The antenna array 135 is arranged to transmit and receive a radio signal via the plurality of transceivers 140a, 140b. Part of the inventive concept is based on distributing phase references wirelessly instead of via cable. Thus, the system 100 further comprises a synchronization signal generator 110 arranged to transmit wirelessly at least one synchronization signal. The synchronization signal generator may comprise one or more antennas 120a, 120b arranged to transmit wirelessly the at least one synchronization signal. In order to ensure that a phase reference is not at, or close to, a zero-crossing at the time it is received, which would mean that the signal would be too weak to be detected, diversity is provided to ensure that the provided phase references at any given time have a component that has a strong enough amplitude for it to be detected. In other words, each synchronization signal comprises at least one time-dependent signal component. The at least one synchronization signal has at least one time-dependent signal component with an amplitude above a predetermined threshold during a total duration of the at least one synchronization signal. In theory, all synchronization signals each comprise at least one periodic tone. However, in reality, the synchronization signals need to be turned on and off at some point, which means that the synchronization signals may not appear periodic for the total duration of their existence. Thus, by signal component we here mean a periodic tone under a total duration of a synchronization signal. For instance, if the total duration of the synchronization signal is shorter than the period of a tone, the corresponding signal component will correspond to a partial period of the tone.

Diversity is achieved by arranging the time-dependent fading pattern of the time-dependent signal components, i.e. the periodic tones, to ensure that at least one of them always has an amplitude above a predetermined threshold. The predetermined threshold is preferably arranged to ensure that the amplitude is strong enough to be detected by its intended receiver. Some examples of the predetermined threshold are a transmit power measure or a signal to noise ratio. In order to achieve sufficient diversity, i.e. to ensure that there always is a signal component above the predetermined threshold during the total duration of the synchronization signal, at least two time-dependent signal components are needed. When the amplitude of one signal component passes below the predetermined threshold, e.g. during a zero-crossing, the amplitude of the other signal component is arranged to be above the predetermined threshold.

One way of ensuring that the at least one synchronization signal is arranged to have the necessary diversity, is to have each synchronization signal comprise at least two time-dependent signal components. In other words, according to some aspects, at least one of the at least one synchronization signal comprises a plurality of time-dependent signal components.

Alternatively, or in combination with at least one of the at least one synchronization signal comprising a plurality of time-dependent components, diversity may be achieved by simultaneously transmitting two or more synchronization signals, each synchronization signal being phase shifted with respect to the other synchronization signals. In other words, according to some aspects, the synchronization signal generator 110 is arranged to transmit wirelessly a plurality of synchronization signals, wherein each pair of synchronization signals has a relative phase shift. The desired fading pattern, i.e. the diversity, is thus achieved by the superposition of synchronization signals, wherein each synchronization signal comprises at least one time-dependent signal component. According to some further aspects, at least one of the relative phase shifts is time dependent. By arranging the phase shift to be time-dependent, it is possible to obtain a greater variation in the time-dependent fading pattern of the plurality of time-dependent signal components. According to some aspects, the time-dependent phase shift has a linear time-dependence. The case that the phase sweep is linear becomes equivalent, from a receiver point of view, to a scheme wherein a synchronization signal comprises a plurality of time-dependent signal components.

Each transceiver 140a, 140b is connected to a respective synchronization signal receiver 130a, 130b arranged to receive the at least one synchronization signal. With a suitable choice of the predetermined threshold, the amplitudes may be used as a basis for detecting the at least one synchronization signal and subsequently determine the phase of the at least one synchronization signal. Therefore, according to some aspects, each synchronization signal receiver 130a, 130b is further arranged to detect the at least one synchronization signal based on the at least one amplitude of the at least one time-dependent signal components. With a plurality of time-dependent signal components, the at least one synchronization signal will have a time-dependent envelope, whose characteristics may be used to detect the synchronization signals. For instance, maximum of the envelope and/or features based on differentials with respect to time of the envelope may be used as a basis for detecting the at least one synchronization signal. Thus, according to some aspects, each synchronization signal receiver 130a, 130b is further arranged to detect the at least one synchronization signal based on envelope characteristics of the at least one synchronization signal. According to some further aspects, the time-dependent signal components are arranged to be separated in frequency such that the envelope may be filtered out by a phase-locked loop filter, which may create a more stable reference.

With the at least one synchronization signal detected, the respective phases can be determined. Each synchronization signal receiver 130a, 130b is preferably arranged to determine a phase of the at least one synchronization signal simultaneous to detection of the at least one synchronization signal. Thus, according to some aspects, the synchronization signal receiver 130a, 130b is further arranged to determine a phase of the at least one synchronization signal based on at least one of the time-dependent signal components. According to some further aspects, the signal receiver 130a, 130b is further arranged to determine the phase of the at least one synchronization signal based on a zero-crossing of the time-dependent signal components or a zero-crossing of an envelope of the at least one synchronization signal.

With the at least one synchronization signal received, the synchronization signal receiver 130a, 130b has all the information necessary to generate a reference signal for the respective transceiver. Thus, the synchronization signal receiver 130a, 130b is arranged to generate a reference signal for the respective transceiver based on the received at least one synchronization signal.

In some preferred aspects, the synchronization signal generator 110 is arranged to generate the at least one synchronization signal comprising time-dependent signal components having frequencies higher than the frequency of the desired carrier to be generated by the transceivers, which in turn is based on the generated reference signal. According to some further aspects, the time-dependent signal components have frequencies that are respective factors of the frequency of the desired reference signal. The idea of transmitting synchronization signals at frequencies higher than that of the desired carrier is that a higher resolution of the phase of a respective synchronization signal may be determined. In other words, the higher the frequency of a synchronization signal, the lower the phase noise. The phase noise may be used as a measure of a how good the synchronization signal is as a phase reference. With the phase determined at a high factor of the frequency of the desired reference signal, the desired reference signal may then be generated by down-converting the synchronization signal. Therefore, according to some aspects, the reference signal is based on down-converting the received at least one synchronization signal. According to some further aspects, each synchronization signal receiver 130a, 130b is further arranged to generate the reference signal having a phase based on the determined phase of at least one synchronization signal and a frequency based on down-converting the at least one time-dependent signal component of the at least one synchronization signal.

In order to keep complexity and costs down, each synchronization signal receiver 130a, 130b may comprise a frequency synthesiser 131a, 131b arranged to generate the reference signal based on down-converting each received synchronization signal. According to some further aspects, each frequency synthesiser 131a, 131b comprises a voltage controlled oscillator 132a, 132b arranged to generate the carrier based on down-converting each received synchronization signal. The voltage controlled oscillator 132a, 132b may be comprised in a phased-locked loop.

It may be desirable to reduce or eliminate environmental influence on the at least one synchronization signal. Thus, according to some aspects, the system 100 further comprises an electromagnetically sealed box 150, wherein the synchronization signal generator 110 is arranged inside the electromagnetically sealed box. Each synchronization signal receiver 130a, 130b is arranged to receive the at least one synchronization signal and each transceiver 140a, 140b is arranged to transmit a generated carrier outside of the electromagnetically sealed box 150 based on the reference signal from the respective synchronization signal receiver 130a, 130b. The electromagnetically sealed box 150 confines the at least one synchronization signal within the electromagnetically sealed box 150 and prevents interference from factors external to the electromagnetically sealed box 150. When confined within the electromagnetically sealed box 150, the at least one synchronization signal will give rise to standing waves, along with a fading pattern of constructive and destructive interference. According to some further aspects, each synchronization signal receiver 130a, 130b is arranged to detect at least one of the time-dependent signal components of the at least one synchronization signal based on estimating time-invariant characteristics of standing waves of the at least one synchronization signal inside the electromagnetically sealed box 150. The time-invariant characteristics will depend on the dimensions of the electromagnetically sealed box 150 and the material of electromagnetically sealed box 150. The time-invariant characteristics may therefore be determined at the point of manufacture once and for all. The time-invariant characteristics may then be used when determining the phase of the at least one synchronization signal.

According to some aspects, at least one of the at least one synchronisation signal is further modulated to include data. The included data may be provided to downstream functions to extend the functionality of the system 100 or as part of the data being transmitted by the antenna array 135.

According to some aspects, the system comprises processing circuitry 112. The processing circuitry 112 may be any suitable type of computation unit, e.g. a microprocessor, digital signal processor, DSP, field programmable gate array, FPGA, or application specific integrated circuit, ASIC, or any other form of circuitry. It should be appreciated that the processing circuitry 112 need not be provided as a single unit but may be provided as any number of units or circuitry.

According to some aspects the processing circuitry 112 comprises modules configured to perform the methods described above and below. The modules are implemented in hardware or in software or in a combination thereof. The modules are according to one aspect implemented as a computer program stored in a memory 113 which run on the processing circuitry 112.

Hence, according to some aspects, the processing circuitry 112 comprises a transmit module M10 arranged to transmit wirelessly, from the synchronization signal generator 110, at least one synchronization signal, each synchronization signal comprising at least one time-dependent signal component. At least one of the time-dependent signal components of the at least one synchronization signal has at least one amplitude above a predetermined threshold during a duration of the at least one synchronization signal.

The processing circuitry 112 further comprises a receive module M20 arranged to receive the at least one synchronization signal at a synchronization signal receiver 130a, 130b arranged to receive the at least one synchronization signal, the synchronization signal receiver 130a, 130b being connected to a respective transceiver 140a, 140b of the antenna array 135 comprising a plurality of transceivers 140a, 140b.

The processing circuitry 112 also comprises a reference signal generating module M30 arranged to generate a reference signal for the respective transceiver 140a, 140b based on the received at least one synchronization signal.

According to some aspects, the processing circuitry 112 further comprises a transmit module M11 arranged to transmit wirelessly a plurality of synchronization signals, wherein each pair of synchronization signals has a relative phase shift.

According to some aspects, the processing circuitry 112 further comprises a detect module M21 arranged to detect the at least one synchronization signal based on the at least one amplitude of the at least one time-dependent signal components.

According to some aspects, the processing circuitry 112 further comprises a down-converting module M31 arranged to down-convert the received at least one synchronization signal.

Figure 2A:
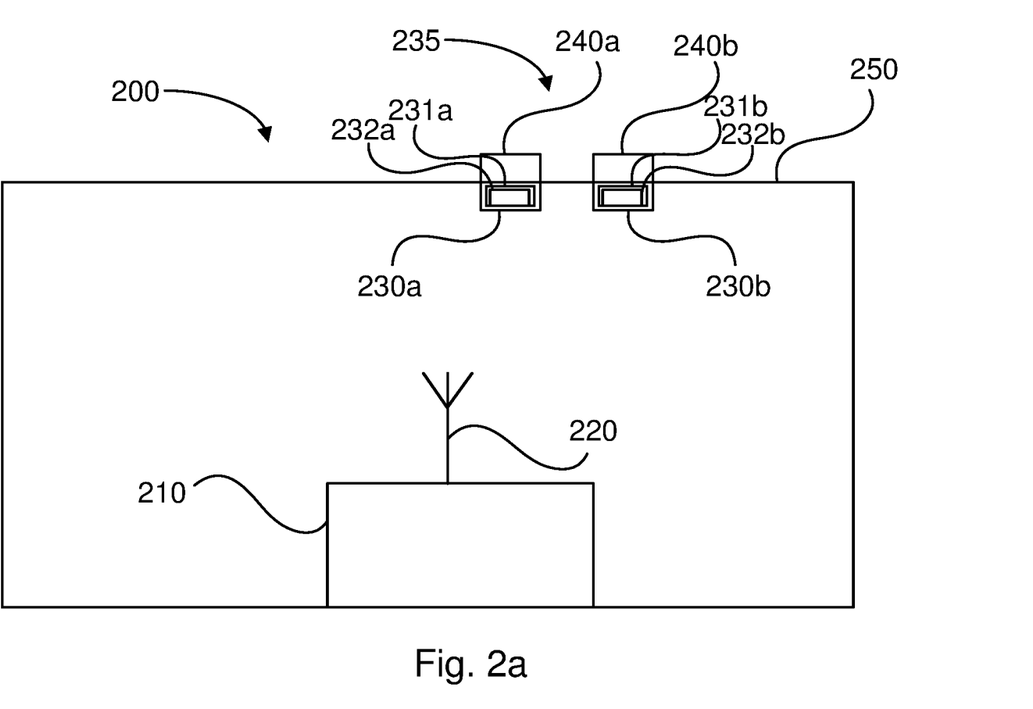
FIG. 2a is block diagram illustrating embodiments of a system for wireless reference signal distribution according to the present disclosure.

FIG. 2a is block diagram illustrating embodiments of a system 200 for wireless reference signal distribution according to the present disclosure. FIG. 2 aims at illustrating the use of synchronization signals comprising a plurality of periodic tones. The system 200 comprises an antenna array 235 comprising a plurality of transceivers 240a, 240b, the antenna array 235 being arranged to transmit and receive a radio signal via the plurality of transceivers 240a, 240b. The system 200 further comprises a synchronization signal generator 210 arranged to transmit wirelessly a synchronization signal. The synchronization signal generator 210 preferably comprises one or more antennas, each arranged to transmit wirelessly the same synchronization signal. For illustrative purposes, the synchronization signal generator comprises one antenna 220 arranged to transmit wirelessly the synchronization signal. The synchronization signal comprises two time-dependent signal components. The synchronization signal has at least one time-dependent signal component with an amplitude above a predetermined threshold during a total duration of the synchronization signal.

To facilitate understanding, this is illustrated here by basing the wirelessly transmitted synchronization signal on a signal comprising two periodic tones at separate frequencies. The wirelessly transmitted synchronization signal may comprise more than two time-dependent signal components. The two periodic tones are arranged in frequency and relative phase such that at least one of the tones always has an amplitude above the predetermined threshold. According to some aspects, the amplitudes and the predetermined threshold are defined in terms of a signal to noise ratio. An amplitude above the predetermined threshold is then to be interpreted as a detectable time-dependent signal component. Since the total duration of the synchronization signal may not match the periods of the tones, the synchronization signal comprises time-dependent signal components in the form of time-dependent amplitudes during the total duration of the synchronization signal. To reduce the phase noise, a high factor of the desired carrier is used. Since the synchronization signal generator 210 constitutes one common reference oscillator, this may be built using high quality, low phase-noise technology. In other words, the reference signal is based on down-converting the received at least one synchronization signal.

Each transceiver 240a, 240b is connected to a respective synchronization signal receiver 230a, 230b arranged to receive the synchronization signal. The synchronization signal receiver 230a, 230b is arranged to generate a reference signal for the respective transceiver 240a, 240b based on the received synchronization signal.

The system 200 further comprises an electromagnetically sealed box 250. The synchronization signal generator 210 is arranged inside the electromagnetically sealed box 250. The synchronization signal generator 210 is preferably centralized inside the electromagnetically sealed box 250 with respect to the antenna array. With the synchronization signals shielded and transmitted wirelessly from the centralized synchronization signal generator, degradation and delays of the reference signal are reduced. Any phase dispersion caused by the multi-path propagation of the transmitted synchronization signal will be stationary and may thus be compensated for in channel estimation.

According to some aspects, the antenna array 235 comprises a plurality of integrated circuits, ICs. The ICs are mounted on the back, i.e. ground plane, of the antenna array 235. According to some further aspects, each IC is directly connected to a patch antenna, and each IC contains the radio frequency, RF, and baseband processing circuitry required by that antenna. Electrical connections are furthermore provided at each IC for the transmission of baseband data. All electronics is mounted inside the electromagnetically shielded box 250, on which the antenna array 235 itself constitutes one of the faces. Each synchronization signal receiver 230a, 230b is arranged to receive the at least one synchronization signal. According to some aspects, each IC has a receptor antenna that is arranged to detect the synchronization signal and use it to trigger the control of frequency synthesiser, e.g. a voltage controlled oscillator 232a, 232b, the voltage controlled oscillator 232a, 232b possibly being part of a phase-locked loop, in order to generate a reference signal. Stated differently, each synchronization receiver 230a, 230b comprises a respective IC as described above. The receptor antenna may be an external antenna or an integrated antenna. According to some aspects, the baseband processing circuitry and the respective transceiver are placed close to a respective antenna in the array, or mounted directly on the backside of a respective antenna element. The unit may comprise a single semiconductor chip with all functionality integrated, each chip serving one antenna only. Each chip will need an antenna to receive the wireless synchronization signals. For higher output power, and other requirements similar to today's demonstrators, the IC needs to be shielded in a cavity, and with a separate antenna outside the chips. Thus, according to some aspects, the synchronization signal receiver 230a, 230b comprises a receive antenna arranged in a cavity, wherein the cavity is arranged to electromagnetically shield the receive antenna from interference from neighbouring antennas of the antenna array. However, in the future when no shielding/cavities may be used, the receive antenna may be placed directly on a chip or as a part of a package. Thus, according to some aspects, the synchronization signal receiver 230a, 230b comprises a receive antenna arranged in an antenna-on-chip arrangement or antenna-in-package arrangement. According to some further aspects, the antenna-on-chip arrangement/antenna-in-package arrangement are arranged based on the desired frequency of operation, the receive antenna size, and the receive antenna gain.

To sum up, each transceiver 240a, 240b is further arranged to transmit a generated carrier outside of the electromagnetically sealed box 250 based on the reference signal from the respective synchronization signal receiver 230a, 230b.

Inside the electromagnetically shielded box 250, if the propagation distance is 1 meter, the coherence bandwidth is on the order of $3*10^8$ m/s/1 m=300 MHz. With a larger electromagnetically shielded box 250, and multiple reflections, the coherence bandwidth is likely to be lower, perhaps by an order of magnitude. The choice of material inside of the electromagnetically shielded box 250 will affect this bandwidth substantially and only measurements can eventually tell the separation between the tones. In a general multitone scheme, the following synchronization signal is received at each chip:

$$x(t) = \Sigma_k a_k \cos(2\pi(f_k+\phi_k)t)$$

which in the illustrated example using two tones reduces to $$x(t) = a*\cos(2*\pi f*t) + b*\cos(2*\pi(f+\delta)*t)$$

where t denotes time, f denotes frequency, and a and b are constants which depend on the geometry and propagation inside the electromagnetically shielded box 250. There are multiple ways that the received synchronization signal can be detected in order to extract f: One may detect the two tones, i.e. time-dependent signal components, separately, estimating in effect f and f+δ, along with a reliability value for each, and then fuse the estimates. Alternatively, one may use a calibration procedure to determine a and b, since these constants are time-invariant due to the static geometry of the electromagnetically shielded box 250—nothing inside moves, and apply more advanced signal processing techniques, such as maximum-likelihood estimates.

Additionally, the transmitted multi-tone synchronization signal will have a non-constant envelope, which may periodically cause the received synchronization signal at some synchronization signal receivers 230a, 230b to vary heavily and, depending on the propagation environment, even drop to zero at select synchronization signal receivers 230a, 230b during short periods of time. This may be relieved by spacing the tones enough such that the envelope-component is filtered out by a phase-locked loop, PLL, loop-filter, which may create a more stable reference.

Figure 2B:
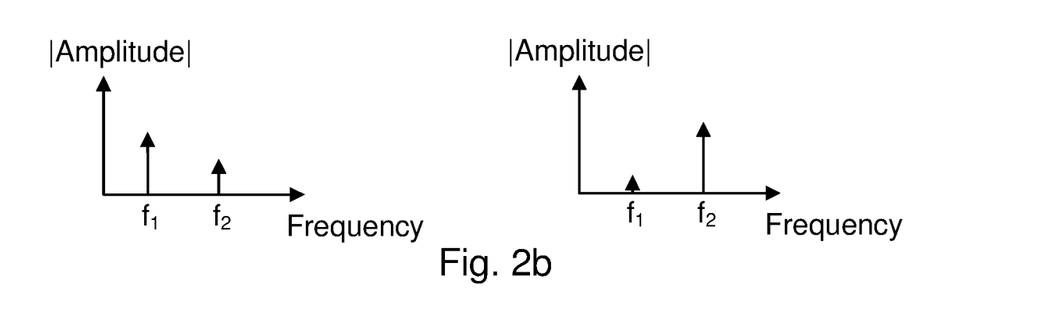
FIG. 2b illustrates signal components of a synchronization signal.

FIG. 2b illustrates a received synchronization signal of the system 200 of FIG. 2a at a first location, left, and a second location, right, respectively. Depending on the position of the synchronization signal receivers 230a, 230b and the wave patterns inside the electromagnetically shielded box 250 illustrated in FIG. 2a, the received signal strength, i.e. the attenuation, may vary. However, for different frequencies, the fading is usually very different for a given position. By providing multiple periodic tones, e.g. two tones as in the illustrated case, with different frequencies diversity against the associated fading pattern is provided.

Figure 3A:
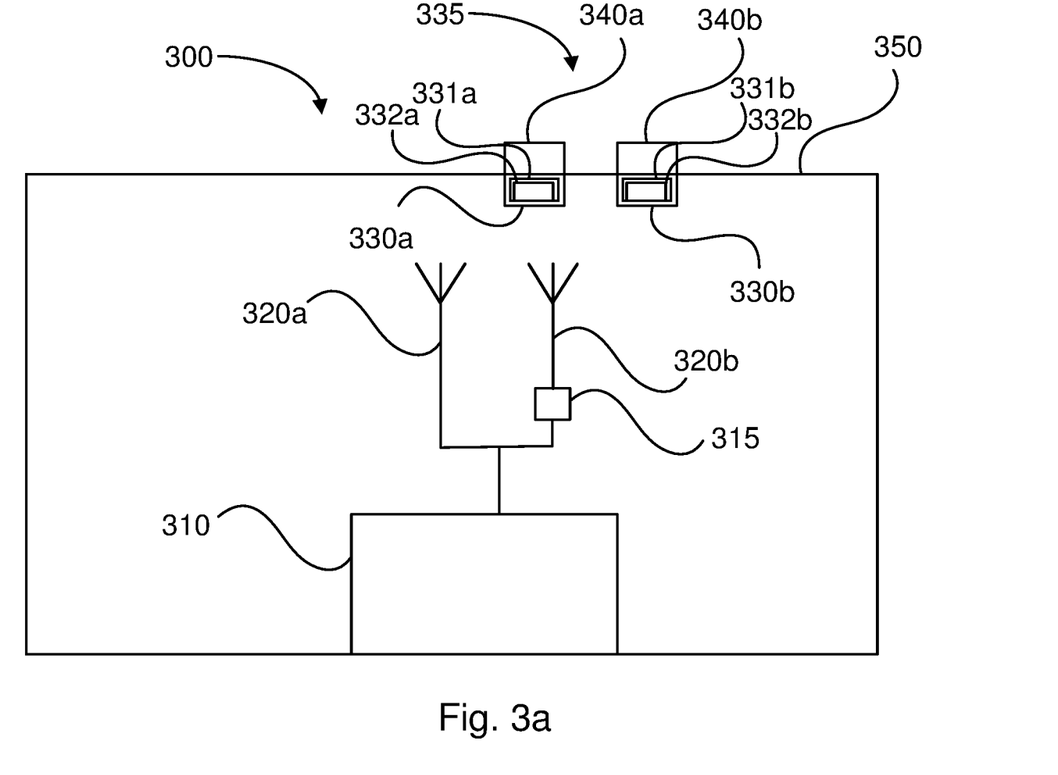
FIG. 3a is block diagram illustrating embodiments of a system for wireless reference signal distribution according to the present disclosure.

FIG. 3a illustrates an alternative approach, with respect to the examples illustrated in FIG. 2a, to obtaining diversity of the at least one synchronization signal. The system 300 is identical to those systems 200 illustrated in FIG. 2a, except that instead of the synchronization signal generator 310 being arranged to transmit wirelessly a synchronization signal comprising two time-dependent signal components, the synchronization signal generator 310 is arranged to transmit wirelessly a plurality of synchronization signals, wherein each pair of synchronization signals has a relative phase shift. To simplify the presentation, a system 300 comprising a synchronization signal generator 310 arranged to transmit wirelessly only two synchronization signals is illustrated, and each synchronization comprise only a single time-dependent signal component. However, the embodiments described herein in relation to FIGS. 3a and 3b may be extended to comprise any number of synchronization signals greater than or equal to two. Furthermore, the embodiments described herein in relation to FIGS. 3a and 3b may be combined with the examples provided in relation to FIGS. 2a and 2b, above. In particular, the synchronization signal generator 310 may be arranged to transmit wirelessly a plurality of synchronization signals, wherein each synchronization signal comprises a plurality of time-dependent signal components.

The synchronization signal generator 310 comprises two antennas 320a, 320b arranged to transmit a respective synchronization signal. According to some aspects, the synchronization signal generator 310 comprises a phase shifting means 315 arranged to provide the relative phase shift. According to some further aspects, the relative phase shift is time-dependent. With the two-antenna approach, the synchronization signal received at a synchronization signal receiver 330a, 330b is $$x(t)=a*\cos(2*\pi*f*t)+b*\cos(2*\pi*f*t+\phi(t))$$

where $\phi(t)$ is a slowly swept phase. In the special case that the phase sweep is linear, i.e. $\phi(t)$=constant*t, this approach becomes equivalent, from the synchronization signal receiver 330a, 330b point of view, to the multi-tone scheme illustrated in relation to FIGS. 2a and 2b. By choosing $\phi(t)$ intelligently, more diversity may be achieved, but a more advanced synchronization signal receiver 330a, 330b is needed as well.

Figure 3B:
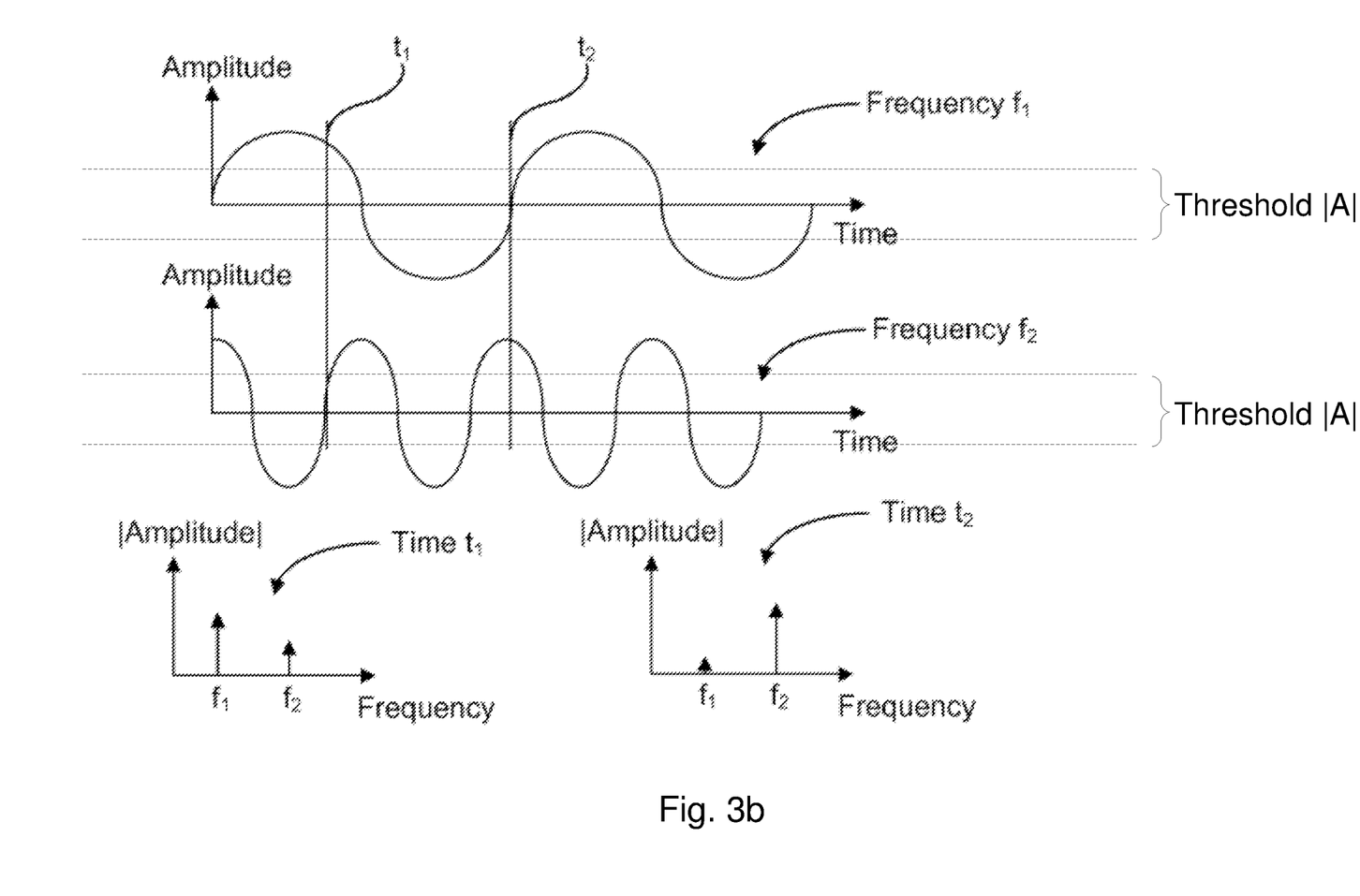
FIG. 3b illustrates signal components of a synchronization signal.

FIG. 3b illustrates fading patterns at a given location at two different times, $t_1$ and $t_2$. Illustrated is two synchronization signals emitted by two different antennas 320a, 320b, with a relative, time-variant phase shift. At a fixed, given location, the amplitude of the multiple tones in x(t) will vary slightly with time. Thanks to the diversity offered by the resulting superposition of the two synchronization signals, not all its components will be in a fading dip simultaneously.

Figure 4:
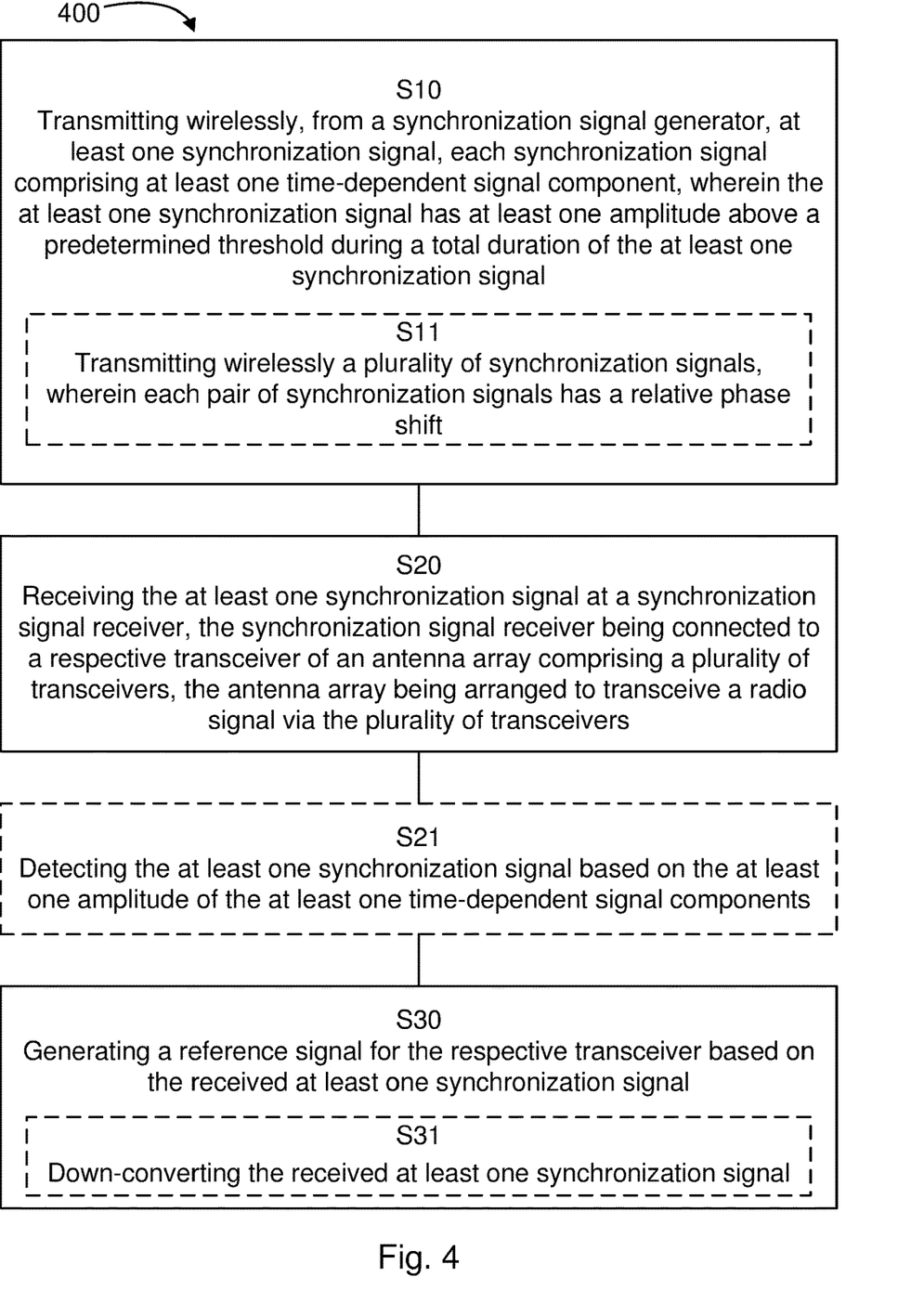
FIG. 4 is a flow diagram illustrating embodiments of a method for wireless reference signal distribution according to the present disclosure.

FIG. 4 is a flow diagram illustrating embodiments of a method 400 for wireless reference signal distribution according to the present disclosure. The method 400 for wireless reference signal distribution comprises transmitting wirelessly S10, from a synchronization signal generator, at least one synchronization signal. Each synchronization signal comprises at least one time-dependent signal component. The at least one synchronization signal has at least one amplitude above a predetermined threshold during a total duration of the at least one synchronization signal. The disclosed method 400 enables providing well-defined phase references for antenna arrays in an inexpensive and power-efficient manner. No cables, connectors or splitters are needed for the distribution of the synchronization signals. The disclosed method 400 is largely independent of physical dimensions of the underlying system for the wireless reference signal distribution and hence scales very favourably with the antenna array aperture. The wireless transmission reduces degradation and delays of the synchronization signals compared to legacy systems and methods of providing reference signals. The disclosed method 400 further enables the use of transceivers already available as a mature technology, such as millimetre-wave transceivers. By always having a detectable component during the total duration of the at least one synchronization signal, it is ensured that the synchronization signal receiver will always be able to detect the at least one synchronization signal, thereby ensuring that the reference signal distribution is reliable and robust.

As has been described above in relation to FIGS. 1-3, obtaining the desired diversity, i.e. ensuring that at least one of the time-dependent signal components of the at least one synchronization signal has at least one amplitude above a predetermined threshold during a duration of the at least one synchronization signal may be achieved by having each synchronization signal comprising a plurality of time-dependent signal components, transmitting wirelessly a plurality of synchronization signals or a combination thereof. Thus, according to some aspects, at least one of the at least one synchronization signal comprises a plurality of time-dependent signal components. According to some further or alternative aspects, transmitting wirelessly S10 at least one synchronization signal comprises transmitting S11 wirelessly a plurality of synchronization signals, wherein each pair of synchronization signals has a relative phase shift. According to some further aspects, at least one of the relative phase shifts is time dependent. Time-dependent phase shifts enable a more complex fading pattern of the superposition of the plurality of synchronization signals compared to relying on a synchronization signal comprising a plurality of time-dependent signal components.

The method 400 further comprises receiving S20 the at least one synchronization signal at a synchronization signal receiver arranged to receive the at least one synchronization signal. The synchronization signal receiver is connected to a respective transceiver of an antenna array comprising a plurality of transceivers, the antenna array being arranged to transmit and receive a radio signal via the plurality of transceivers. According to some aspects, the method 400 comprises detecting S21 the at least one synchronization signal based on the at least one amplitude of the at least one time-dependent signal components.

The method 400 also comprises generating S30 a reference signal for the respective transceiver based on the received at least one synchronization signal. According to some aspects, generating S30 the reference signal further comprises down-converting S31 the received at least one synchronization signal. By down-converting S31 the at least one synchronization signal to the desired frequency, a better phase resolution is obtained. The improvement in phase resolution is proportional to the factor at which the down-converting is made.

The present disclosure also relates to computer programs for wireless reference signal distribution, the computer program comprising computer program code which, when executed, causes a system for wireless reference signal distribution as described above and below to carry out the method for wireless reference signal distribution as described above and below.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Some of the various example embodiments described herein are described in the general context of functional units, method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory, ROM, Random Access Memory, RAM, compact discs, CDs, digital versatile discs, DVDs, etc. Generally, program modules may include routines, programs, objects, components, data structures, etc. that performs particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The invention claimed is:

1. A system for wireless reference signal distribution, the system comprising:
an antenna array comprising a plurality of transceivers and one or more synchronization signal receivers, the antenna array configured to transmit and receive a radio signal via the plurality of transceivers;
a synchronization signal generator configured to transmit wirelessly a set of two or more synchronization signals, each synchronization signal in the set comprising at least one time-dependent signal component, such that, at all times for the duration of the set of two or more synchronization signals, at least one time-dependent signal component in the set of two or more synchronization signals has an amplitude above a predetermined threshold; and
wherein each transceiver is connected to a respective synchronization signal receiver configured to receive the set of two or more synchronization signals and to generate a reference signal for the respective transceiver based on the received set of two or more synchronization signals.

2. The system of claim 1, wherein the reference signal is based on down-converting the received set of two or more synchronization signals.

3. The system of claim 1, wherein each synchronization signal receiver is configured to detect the set of two or more synchronization signals based on the at least one amplitude of the at least one time-dependent signal components.

4. The system of claim 1, wherein each synchronization signal receiver is configured to detect the set of two or more synchronization signals based on envelope characteristics of the set of two or more synchronization signals.

5. The system of claim 1, wherein each synchronization signal receiver is configured to determine a phase of the set of two or more synchronization signals based on at least one of the time-dependent signal components.

6. The system of claim 5, wherein each synchronization signal receiver is configured to determine the phase of the set of two or more synchronization signals based on a zero-crossing of the time-dependent signal components or a zero-crossing of an envelope of the set of two or more synchronization signals.

7. The system of claim 5, wherein each synchronization signal receiver is configured to generate the reference signal having:
    a phase based on the determined phase of at least one synchronization signal; and
    a frequency based on down-converting the at least one time-dependent signal component of the at least one synchronization signal.

8. The system of claim 1, wherein at least one of the set of two or more synchronization signals comprises a plurality of time-dependent signal components.

9. The system of claim 1, wherein the synchronization signal generator is configured to transmit wirelessly a plurality of phase-shifted synchronization signals.

10. The system of claim 9, wherein at least one of the plurality of phase-shifted synchronization signals includes one or more relative phase shifts that is time dependent.

11. The system of claim 1, wherein each synchronization signal receiver comprises a frequency synthesizer configured to generate the reference signal based on down-converting each received synchronization signal.

12. The system of claim 11, wherein each frequency synthesizer comprises a voltage controlled oscillator configured to generate a carrier based on down-converting each received synchronization signal.

13. The system of claim 1:
    further comprising an electromagnetically sealed box;
    wherein the synchronization signal generator is disposed inside the electromagnetically sealed box;
    wherein each synchronization signal receiver is configured to receive the set of two or more synchronization signals; and
    wherein each transceiver is configured to transmit a generated carrier outside of the electromagnetically sealed box based on the reference signal from the respective synchronization signal receiver.

14. The system of claim 13, wherein each synchronization signal receiver is configured to detect at least one of the time-dependent signal components of the set of two or more synchronization signals based on estimating time-invariant characteristics of standing waves of the set of two or more synchronization signals inside the electromagnetically sealed box.

15. The system of claim 1, wherein at least one of the set of two or more synchronization signals is further modulated to include data.

16. A method of wireless reference signal distribution, the method comprising:
    transmitting wirelessly, from a synchronization signal generator, a set of two or more synchronization signals, each synchronization signal in the set comprising at least one time-dependent signal component, such that, at all times for the duration of the set of two or more synchronization signals, at least one time-dependent signal component of the in the set of two or more synchronization signals has an amplitude above a predetermined threshold;
    receiving the set of two or more synchronization signals at a synchronization signal receiver, the synchronization signal receiver being connected to a respective transceiver of an antenna array comprising a plurality of transceivers, the antenna array configured to transmit and receive a radio signal via the plurality of transceivers; and
    generating a reference signal for the respective transceiver based on the received set of two or more synchronization signals.

17. The method of claim 16, further comprising detecting the set of two or more synchronization signals based on the at least one amplitude of the at least one time-dependent signal components.

18. The method of claim 16, wherein the generating the reference signal comprises down-converting the received set of two or more synchronization signals.

19. The method of claim 16, wherein at least one of the set of two or more synchronization signals comprises a plurality of time-dependent signal components.

20. The method of claim 16, wherein the transmitting wirelessly set of two or more synchronization signals comprises transmitting wirelessly a plurality of synchronization signals, wherein each pair of synchronization signals has a relative phase shift.

* * * * *